United States Patent Office 2,723,280
Patented Nov. 8, 1955

2,723,280
1-METHYL-17-ETHINYL-ESTRADIOL

Hans Herloff Inhoffen, Braunschweig, Germany, and Ole Ludvig Bremer, Bagsvaerd, Denmark, assignors to Løvens Kemiske Fabrik ved A. Kongsted, Copenhagen, Denmark, a Danish corporation No Drawing. Application August 18, 1954,
Serial No. 450,777

Claims priority, application Denmark August 27, 1953

6 Claims. (Cl. 260—397.5)

This invention relates to and has as its object the production of a novel chemical compound, 1-methyl-17-ethinyl-estradiol, which has been found to constitute a highly active therapeutically valuable estrogenic material, which may be administered orally.

The 1-methyl-17-ethinyl-estradiol in accordance with the invention has the following formula:

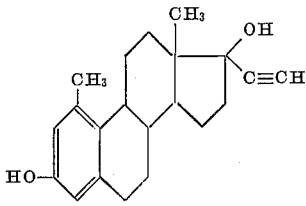

and may be produced by reacting 1-methyl-estrone with a metal compound of acetylene, and thereafter hydrolyzing the reaction product obtained.

The starting 1-methyl-estrone is known and may be obtained, for example, in the manner as described in the Journal of the American Chemical Society (vol. 75, page 3159 (1953) and vol. 72, page 4540 (1950)).

The metal compound of acetylene reacted with the 1-methyl-estrone is preferably formed in the same solution in which the 17-ethinyl compound is subsequently produced. The solutions of metal compounds of acetylene may be produced by various conventional methods.

If the metal compound is a Grignard compound of acetylene, it is convenient to employ magnesium bromide-acetylide. Br—Mg—C≡CH, which may be produced as a solution in the known manner by reacting acetylene with a solution of phenyl magnesium bromide in an organic solvent, and preferably ether.

If the metal compound of acetylene is an acetylide of an alkali metal, solutions of these acetylides may be prepared by reacting acetylene with a solution of the alkali metal, either in liquid anhydrous ammonia or in a tertiary alcohol, as, for example, tertiary butyl or amyl alcohol.

The following examples are given to further illustrate the invention and not to limit the same.

Example 1

A solution of 1.35 g. magnesium in a mixture of 6.9 g. bromobenzene and 75 ml. ether were heated to faint boiling for 20 hours while steadily bubbling acetylene through the solution. Thereafter, a solution of 200 mg. 1-methyl-estrone in 25 ml. anisol was added dropwise to the solution, while stirring with continued bubbling of acetylene through the mixture. The heating and bubbling through of acetylene was continued for further 2 hours, and thereafter the mixture was stirred without heating or introducing acetylene for 24 hours. The reaction mixture was then poured into a mixture of 50 g. crushed ice and 50 ml. 1-normal sulfuric acid, while stirring. The organic phase was separated, washed with 1-normal sulfuric acid, and subsequently with water to neutral reaction; dried with anhydrous sodium sulfate, and evaporated in vacuum to dryness. By recrystallisation of the residue from aqueous methanol 1-methyl-17-ethinyl-estradiol was obtained with M. P. 138–139° C. and absorption at 285 mμ.

Example 2

2.0 g. potassium cut in small pieces were dissolved in 100 ml. liquid anhydrous ammonia which was cooled by means of a mixture of acetone and solid carbonic acid. Thereafter acetylene, previously purified by bubbling through concentrated sulfuric acid, was introduced into the solution until the blue color had disappeared. A solution of 1.0 g. of 1-methyl-estrone in a mixture of 50 ml. dioxane and 50 ml. ether was then added dropwise during 1 hour, and thereafter the reaction mixture remained in the freezing bath for a further hour. The reaction mixture was subsequently left standing for 12 hours at room temperature, whereby its content of ammonia evaporated.

Water and ice were added to the residue and thereafter sulfuric acid to pH=about 2. The solution was then extracted three times with ether. The ethereal solution was washed with water, a 5% solution of sodium carbonate, and again with water to neutral reaction, dried with anhydrous sodium sulfate, and evaporated to dryness. The residue was recrystallized from aqueous methanol, whereby 1.0 g. of 1-methyl-17-ethinyl-estradiol was obtained with M. P. 138–139° C.

Example 3

In a flask provided with a stirrer, an inlet tube for gas, two funnels for addition of solutions, and an exit tube for gas were placed 75 ml. of anhydrous ether through which acetylene, previously purified by bubbling through concentrated sulfuric acid, was bubbled during 1 hour.

During 45 minutes a solution of 1.0 g. potassium in 20 ml. anhydrous tertiary amyl alcohol was added dropwise from one of the funnels, and during the same period of time a solution of 1.0 g. 1-methyl-estrone in a mixture of 25 ml. dioxane and 25 ml. anhydrous ether was added from the other funnel. During these additions and for a further period of 6 hours, acetylene was bubbled through the reaction mixture in the flask, the same being kept at room temperature by cooling with water.

200 ml. of a 5% ice-cooled solution of sulfuric acid were subsequently added to the reaction mixture while stirring. The mixture was transferred to a separating funnel; the two phases were separated; and the aqueous phase extracted twice, each time with 50 ml. ether. The joint ethereal extracts were washed with water, a 5% solution of sodium carbonate, and again with water to neutral reaction. Thereafter, the solution was dried with anhydrous sodium sulfate and evaporated to dryness.

The residue was recrystallized from methanol, whereby 0.90 g. of 1-methyl-17-ethinyl-estradiol were obtained with M. P. 138–9° C.

Example 4

In order to illustrate the estrogenic activity of the novel 1-methyl-17-ethinyl-estradiol in accordance with the invention as compared with other estrogenic compounds, the Allen-Doisy test was conducted with the compounds being administered orally.

The results of the test are indicated in the table below. The number opposite each of the compounds designates the amount of gamma (1 gamma=0.001 mg.) of the estrogenic compound which had to be administered to provoke rut in 50% of the test animals used. As may be seen, the novel 1-methyl-17-ethinyl-estradiol in accordance with the invention showed an activity many times that of estrone and estradiol and twice that of 17-ethinyl-estradiol.

| | |
|---|---|
| Estrone | 50γ |
| Estradiol | 50γ |
| 17-ethinyl-estradiol | 6γ |
| 1-methyl-17-ethinyl-estradiol | 3γ |

We claim:

1. As a new chemical compound, 1-methyl-17-ethinyl-estradiol.

2. Method for the production of 1-methyl-17-ethinyl-estradiol, which comprises contacting 1-methyl-estrone with a metal compound of acetylene, hydrolyzing the reaction product formed, and recovering 1-methyl-17-ethinyl-estradiol.

3. Method according to claim 2, in which said hydrolysis is effected with an aqueous solution of a strong acid.

4. Method according to claim 2, in which said metal compound of acetylene is a Grignard compound of acetylene formed by reacting acetylene with a solution of phenylmagnesium bromide in an organic solvent.

5. Method according to claim 2, in which said metal compound of acetylene is an alkali metal acetylide formed by reacting acetylene with a solution of an alkali metal in ammonia.

6. Method according to claim 2, in which said metal compound of acetylene is an alkali metal acetylide formed by dissolving an alkali metal in a tertiary alcohol and thereafter contacting the solution with acetylene.

References Cited in the file of this patent

UNITED STATES PATENTS

| | | |
|---|---|---|
| 2,251,939 | Kathol | Aug. 12, 1941 |
| 2,280,236 | Inhoffen | Apr. 21, 1942 |
| 2,666,769 | Colton | Jan. 19, 1954 |
| 2,671,092 | Djerassi | Mar. 2, 1954 |